(12) United States Patent
Heid et al.

(10) Patent No.: US 12,353,560 B2
(45) Date of Patent: Jul. 8, 2025

(54) CODE CLEANUP TOOL IN BUSINESS APPLICATIONS

(71) Applicant: Onapsis Inc., Boston, MA (US)

(72) Inventors: Markus Heid, Heidelberg (DE); Sebastian Schoenhofer, Heidelberg (DE)

(73) Assignee: Onapsis Inc., Boston, MA (US)

(*) Notice: Subject to any disclaimer, the term of this patent is extended or adjusted under 35 U.S.C. 154(b) by 645 days.

(21) Appl. No.: 17/219,156

(22) Filed: Mar. 31, 2021

(65) Prior Publication Data
US 2021/0303698 A1 Sep. 30, 2021

Related U.S. Application Data

(60) Provisional application No. 63/002,801, filed on Mar. 31, 2020.

(51) Int. Cl.
| | |
|---|---|
| *G06F 21/57* | (2013.01) |
| *G06F 8/30* | (2018.01) |
| *G06N 5/04* | (2023.01) |
| *G06N 20/00* | (2019.01) |
| *G06Q 10/0631* | (2023.01) |

(52) U.S. Cl.
CPC ............. *G06F 21/577* (2013.01); *G06F 8/30* (2013.01); *G06N 5/04* (2013.01); *G06N 20/00* (2019.01); *G06Q 10/0631* (2013.01); *G06F 2221/033* (2013.01)

(58) Field of Classification Search
CPC .... G06F 21/577; G06F 8/30; G06F 2221/033; G06F 11/362; G06F 11/0793; G06N 20/00; G06N 5/04; G06Q 10/0631
See application file for complete search history.

(56) References Cited

U.S. PATENT DOCUMENTS

| | | | | |
|---|---|---|---|---|
| 9,471,797 | B1* | 10/2016 | Biller | G06F 21/604 |
| 10,884,903 | B1* | 1/2021 | Barua | G06F 11/3664 |
| 2009/0171648 | A1* | 7/2009 | Watanabe | G06F 11/3664 |
| | | | | 703/21 |
| 2009/0183244 | A1* | 7/2009 | Saraf | G06F 21/604 |
| | | | | 726/6 |
| 2013/0232472 | A1* | 9/2013 | Korner | G06F 8/77 |
| | | | | 717/127 |

(Continued)

OTHER PUBLICATIONS

Hanif et al., "An Efficient Serially Concatenated Polar Code with Unequal Error Protection Property," 2019 IEEE 4th International Conference on Computer and Communication Systems (ICCCS) Year: 2019 | Conference Paper | Publisher: IEEE.*

(Continued)

*Primary Examiner* — Roderick Tolentino
(74) *Attorney, Agent, or Firm* — Crowell & Moring LLP

(57) ABSTRACT

Security can be improved in business application, such as an enterprise resource planning ("ERP") system, by detecting and automatically cleaning or fixing custom code of systems/applications. In one embodiment, a Cleanup Tool enables the removal of programming errors using automation that can minimize security risks for a business application. The Cleanup Tool may include an automated correction engine that automates code correction. An Access Analyzer analyzes access through various systems/applications within the business application.

11 Claims, 4 Drawing Sheets

(56) References Cited

U.S. PATENT DOCUMENTS

| | | | |
|---|---|---|---|
| 2015/0033202 A1* | 1/2015 | Wilson | G06F 8/76 |
| | | | 717/106 |
| 2018/0020024 A1* | 1/2018 | Chao | H04L 63/1425 |
| 2019/0042368 A1* | 2/2019 | Khatri | G06F 21/554 |
| 2020/0012970 A1* | 1/2020 | Srivastava | G06F 16/23 |
| 2021/0256122 A1* | 8/2021 | Vaithiyanathan | G06F 8/70 |

OTHER PUBLICATIONS

Yu et al., "Design and Analysis of Unequal Error Protection Rateless Spinal Codes," IEEE Transactions on Communications Year: 2016 | vol. 64, Issue: 11 | Journal Article | Publisher: IEEE.*

* cited by examiner

CODE CLEANUP TOOL IN BUSINESS APPLICATIONS

PRIORITY CLAIM

This application claims priority to Provisional patent application No. 63/002,801, filed on Mar. 31, 2020, entitled "CODE CLEANUP TOOL IN BUSINESS APPLICATIONS", the entire disclosure is herein incorporated by reference.

TECHNICAL FIELD OF THE INVENTION

The present invention relates to improved security by automatically cleaning code within business applications, such as an Enterprise Resource Planning (ERP) system.

BACKGROUND

Businesses may rely on electronic systems using database technology to manage their key processes. There may be a number of business applications that businesses rely on. One example business application is an Enterprise Resource Planning (ERP) landscape/system. Other example business applications include Customer Relationship Management (CRM), Supply Chain Management (SCM), Product Lifecycle Management (PLM), Human Capital Management (HCM), and Business Intelligence (BI). These business applications are in charge of processing sensitive business data and, accordingly, the confidentiality, integrity and availability of this information is therefore critical for the security and continuity of the business. Moreover, all security relevant data of a company or an application is provided in the database system. Therefore, reducing the risk of security leaks or compliance breaches in the database system is a major concern.

Business applications are increasingly connected to external computer systems and are accessible by a continuously growing user base. This means that the exposure of business applications computer systems to external vulnerabilities has grown as well. Vulnerabilities could be created unintentionally or on purpose. Business applications are more in the focus of hackers, such that the likelihood for attacks increases. Of particular concern may be weak points that may be generated by customization of the software and changes to the code. Specifically, operating a large business application, such as an Oracle ERP or SAP® system, may require custom changes to the code or development objects. Such changes may be necessary for certain organizations to ensure proper operation for that organization, but may have increased security risks.

Code changes could create vulnerabilities that can lead to security or compliance breaches. If this occurs, the business or the organization running the application is endangered through loss of critical/protected data, loss of reputation, loss of business, lawsuits, etc. Therefore, it is industry best practice today to apply dedicated tools for analyzing the software to effectively mitigate these risks, such as the risks with improper changes made with custom code. Identification and correction of weak points caused by those changes can require significant effort and be very costly.

BRIEF SUMMARY

The present invention relates to a method, system or apparatus and/or computer program product for detecting and automatically cleaning or fixing custom code of systems/applications within a business application, such as an enterprise resource planning ("ERP") landscape or system. In one embodiment, a Cleanup Tool enables the removal of programming errors using automation that can minimize security risks for a business application landscape. The Cleanup Tool may include an automated correction engine that automates code correction. An Access Analyzer analyzes access through various systems/applications within the business application landscape.

BRIEF DESCRIPTION OF THE DRAWINGS

The figures illustrate principles of the invention according to specific embodiments. Thus, it is also possible to implement the invention in other embodiments, so that these figures are only to be construed as examples. Moreover, in the figures, like reference numerals designate corresponding modules or items throughout the different drawings.

DETAILED DESCRIPTION OF THE DRAWINGS AND PREFERRED EMBODIMENTS

By way of introduction, the disclosed embodiments relate to systems and methods for maintaining security in a system by automatically monitoring and correcting custom software code used in the system. The code monitoring and corrections may be referred to as cleanup. The system may be a business application, such as an enterprise resource planning ("ERP") landscape/system. The ERP system may also be referred to as an ERP landscape, with multiple applications that may be referred to as systems. SAP® and Oracle® ERP Cloud are two examples of an ERP landscape. Other example business applications include Customer Relationship Management (CRM), Supply Chain Management (SCM), Product Lifecycle Management (PLM), Human Capital Management (HCM), and Business Intelligence (BI). The embodiments described herein relate to code monitoring and correction of a business application. The embodiments apply to business applications and may be described with respect to specific examples, such as an ERP landscape/system.

Adapting a business application, such as an ERP landscape or system, to individual businesses or organizations may require custom modifications depending on the business/organization. However, custom code changes to one or more systems in an ERP landscape may create security vulnerabilities. Automated correction of code problems can limit the security vulnerabilities.

Figure 1:
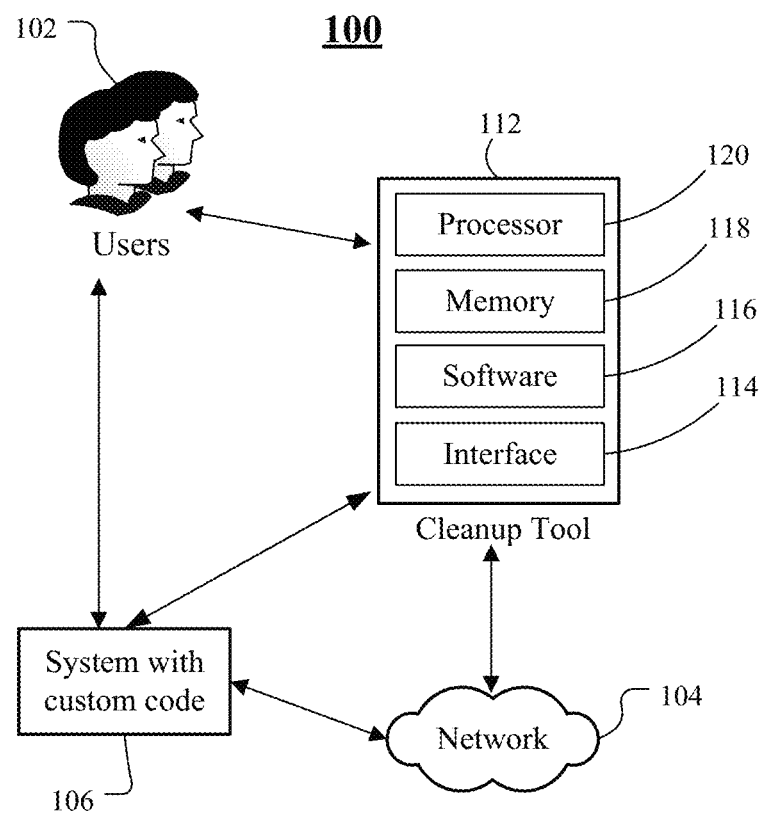
FIG. 1 illustrates a block diagram of an example network system.

FIG. 1 illustrates a block diagram of an example network system 100. The system 100 may be a business application, such as an ERP landscape/system. The system 100 may include functionality for monitoring and correcting custom software code in one or more systems with custom code 106 within a business application, such as an ERP landscape/system. The system with custom code 106 is merely one example and within business application or an ERP landscape/system, there may be numerous systems/applications that have custom code. The exemplary system 106 may be any business application, such as an ERP landscape. The monitoring and correction of code may be performed by a cleanup tool 112. There may be different types of users 102 of the cleanup tool 112 that have different access and control. The cleanup tool 112 may be controlled by users 102 who act as administrators for the business application or the network system 100. Further, there may be other users 102 that access other components of the system 100, including the system 106. Any components may be connected through a network 104, even connections not shown. The network 104 may be an internal network, an external network, or a combination.

The cleanup tool 112 may be a computing device operated by one or more users 102 for monitoring and correcting code within one or more systems with custom code or code modifications, such as system 106. In one embodiment, the cleanup tool 112 may be software that runs on a computing device as shown in FIG. 1. The cleanup tool 112 monitors code and changes to the code for exemplary systems, such as system 106, and automatically corrects issues in the code. The cleanup tool 112 may include a processor 120, a memory 118, software 116 and a user interface 114. In alternative embodiments, the cleanup tool 112 may be multiple devices to provide different functions and it may or may not include all of the user interface 114, the software 116, the memory 118, and/or the processor 120.

The interface 114 provides access and control of the cleanup tool 112 for monitoring and correcting custom code of other systems. The user interface 114 may be a user input device, a display, or another computer system. Another computer system as the user interface 114 may provide input and output via technical channels and API-calls that could be a local direct call or via some technologies for remote call like RPC (Remote Procedure Calls) a/k/a RFC (Remote Function Calls). The user interface 114 may include a keyboard, keypad or a cursor control device, such as a mouse, or a joystick, touch screen display, remote control or any other device operative to allow a user or administrator to interact with the cleanup tool 112. The user interface 114 may communicate with any of the systems in the network 104, including the cleanup tool 112, and/or the system 106. The user interface 114 may include a user interface configured to allow a user and/or an administrator to interact with any of the components of the cleanup tool 112 for monitoring and correcting custom code. The user interface 114 may include a display coupled with the processor 120 and configured to display an output from the processor 120. The output may be information about the custom code. The display (not shown) may be a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor 120, or as an interface with the software 116 for providing data.

The processor 120 in the cleanup tool 112 may include a central processing unit (CPU), a graphics processing unit (GPU), a digital signal processor (DSP) or other type of processing device. The processor 120 may be a component in any one of a variety of systems. For example, the processor 120 may be part of a standard personal computer or a workstation. The processor 120 may be one or more general processors, digital signal processors, application specific integrated circuits, field programmable gate arrays, servers, networks, digital circuits, analog circuits, combinations thereof, or other now known or later developed devices for analyzing and processing data. The processor 120 may operate in conjunction with a software program (i.e. software 116), such as code generated manually (i.e., programmed). The software 116 may include a monitoring and correction of code in systems, such as the system 106. This monitoring and correction may be implemented from software, such as with the software 116.

The processor 120 may be coupled with the memory 118, or the memory 118 may be a separate component. The software 116 may be stored in the memory 118. The memory 118 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The memory 118 may include a random access memory for the processor 120. Alternatively, the memory 118 may be separate from the processor 120, such as a cache memory of a processor, the system memory, or other memory. The memory 118 may be an external storage device or database for storing recorded tracking data, or an analysis of the data. Examples include a hard drive, compact disc ("CD"), digital video disc ("DVD"), memory card, memory stick, floppy disc, universal serial bus ("USB") memory device, or any other device operative to store data. The memory 118 is operable to store instructions executable by the processor 120.

The functions, acts or tasks illustrated in the figures or described herein may be performed by the programmed processor executing the instructions stored in the software 116 or the memory 118. The functions, acts or tasks are independent of the particular type of instruction set, storage media, processor or processing strategy and may be performed by software, hardware, integrated circuits, firmware, micro-code and the like, operating alone or in combination. Likewise, processing strategies may include multiprocessing, multitasking, parallel processing and the like. The processor 120 is configured to execute the software 116.

The present disclosure contemplates a computer-readable medium that includes instructions or receives and executes instructions responsive to a propagated signal, so that a device connected to a network can communicate voice, video, audio, images or any other data over a network. The user interface 114 may be used to provide the instructions over the network via a communication port. The communication port may be created in software or may be a physical connection in hardware. The communication port may be configured to connect with a network, external media, display, or any other components in system 100, or combinations thereof. The connection with the network may be a physical connection, such as a wired Ethernet connection or may be established wirelessly as discussed below. Likewise, the connections with other components of the system 100 may be physical connections or may be established wirelessly.

Any of the components in the system 100 may be coupled with one another through a (computer) network, including but not limited to the network 104. For example, the cleanup tool 112 may be coupled with the system 106 through the network 104. In some ERP systems, the network 104 may be a local area network ("LAN"), or may be a public network such as the Internet. Likewise, there may be connections between any other systems, and those connections may be through different types of network interfaces. Any of the components in the system 100 may include communication ports configured to connect with a network. The network or networks that may connect any of the components in the system 100 to enable communication of data between the devices may include wired networks, wireless networks, or combinations thereof. The wireless network may be a cellular telephone network, a network operating according to a standardized protocol such as IEEE 802.11, 802.16, 802.20, published by the Institute of Electrical and Electronics Engineers, Inc., or WiMax network. Further, the network(s) may be a public network, such as the Internet, a private network, such as an intranet, or combinations thereof, and may utilize a variety of networking protocols now available or later developed including, but not limited to TCP/IP based networking protocols. The network(s) may include one or more of a local area network (LAN), a wide area network (WAN), a direct connection such as through a Universal Serial Bus (USB) port, and the like, and may include the set of interconnected networks that make up the Internet. The network(s) may include any communication method or employ any form of machine-readable media for communicating information from one device to another.

The system 106 is an exemplary system in a business application, such as an ERP landscape/system. There may be many systems that are monitored and corrected by the cleanup tool 112. Specifically, the system 106 may be a system or sub-system within an ERP landscape. In one embodiment, the system 106 may be a database within an ERP system and the code controls the database or is stored with the database. In other embodiments, one or more of the systems may be remote and the interfaces providing access may be through a public or wide area network.

The cleanup tool 112 acts as a security point to correct custom code that may result in security vulnerabilities in the business application or EPR landscape through an interface. The system 106 may be external from the business application or ERP landscape 100 or it may be directly connected, or may be part of the same network, such as the network 104. The systems may be an external third-party provider, so the cleanup tool 112 inspects and corrects the custom code from the third party provider.

The cleanup tool 112 acts as a central hub for analyzing code in any of the systems in a business application or ERP landscape, including SAP® and non-SAP systems. The systems can be grouped and organized for improved data collection, processing, and code correction. Code and development object corrections are made automatically using the cleanup tool 112. The cleanup tool 112 may also be referred to as CleanupSolutions or Cleanup Solutions. The cleanup tool 112 is actually several tools that increase the level of automation in the business application security area.

In one embodiment, there may be a code analysis. For example, code for the interfaces or systems may be analyzed by the cleanup tool 112. U.S. Pat. Pub. No. 2019/0180035 and U.S. Pat. Nos. 8,402,547 and 10,025,688 describe embodiments of a Code Profiler that analyzes code for security vulnerabilities, each of which is hereby incorporated by reference. For example, CodeProfiler for ABAP can be used to find development objects that access specific data. This may be done to find development objects that proceed and disclose critical data but this data is not properly declared in the metadata of the development object or its signature. For example, an exporting parameter of the function module can be declared as STRING, so neither its name nor its type would indicate that the output of the function contains critical information. However, an analysis is able to cover this scenario because of the code analysis capabilities. The analysis from CodeProfiler can also be imported into the cleanup tool 112. Specifically, the CodeProfiler can identify security-related weak points in a business application, such as an ERP landscape. However, manual removal of the weak points may require significant effort and be costly to remove manually. The cleanup tool 112 enables removal of programming errors through the use of automation. The cleanup tool 112 can minimize security risks for systems in the business application. This can protect from unplanned system down times, data theft, cyberattacks, and spying.

The cleanup tool 112 may include automated code corrections, such as for CP4A test domains (e.g. in SAP®) of security, compliance, performance, and robustness. The cleanup tool 112 may include a correction of findings detected on a development system or a loading file with finding information detected on subsequent systems (e.g. a production system). There may be a simulation mode for checking codes changes in advance, as well as including visualizations of the code changes. The code changes can be audited by comparing changes based on before and after states.

Automated Correction Engine

The cleanup tool 112 may include an Automated Correction Engine transaction. The transaction defines a workload as the source of a correction scope and for loading the findings to be corrected and to monitor the correction processing. A workload establishes the source for a correction scope, which is used to load the findings to be corrected and to monitor the progress of correction processing. A workload may be associated with a specific code scan. The workload may include test case findings that the cleanup tool 112 can correct using automation.

Each correction processed by the cleanup tool 112 is indicated in the code, so that the code changes can be identified. Additionally, the cleanup tool 112 tracks all processing steps and changes to the code or to development objects so these changes can be audited.

The cleanup tool 112 may include a correction status about the overall processing status of the correction engine regarding a specific finding. Example status descriptions include: 1) CHECKED—Findings checked for consistency; 2) ERROR—erroneous findings; 3) FIXED—Fixed finding; 4) INIT—Finding in initial state; 5) INPROGRESS—Finding in progress; 6) LOADED—Finding loaded from source; and 7) POSSIBLE—Finding can be fixed.

There may be a status category that provides information about the fixing status of a specific finding. An exemplary list is shown in the table below:

TABLE 1

Status Categories

| Status Category Code | Status Category |
| --- | --- |
| ANAERROR | Analysis error |
| CHECKED | Finding checked |
| CODEINSER | Source code fixed |
| FIXED | Finding fixed |
| FIXSTART | Fix started |
| INCLINSER | Include inserted |
| LOADED | Finding loaded |
| LOCKED | Include locked |
| LOCKERROR | Locking error |
| POSSIBLE | Fix is possible |
| POSTVERSI | Postfix version generated |
| PREVERSIO | Prefix version generated |
| SIMULATED | Fix simulated |
| SRCREAD | Source code read |
| STARTED | Fix started |
| SYNCHEKED | Syntax checked |
| SYNERROR | Syntax error |
| TRANSERRO | Transport error |
| TRANSPORT | Transport updated |
| UNLOCKED | Include unlocked |

TABLE 1-continued

Status Categories

| Status Category Code | Status Category |
| --- | --- |
| UPDERROR | Update error |
| VERSERROR | Version error |

The transaction further defines a correction variant, which is a set of filters and additional input, which filter a workload in order to define the scope of a specific correction run. A correction run is a time frame for fixing findings through automation or to simulate the fixing. There may be test case-specific correction instructions, such as raising an exception or leaving a program. The findings of this set of test cases can be filtered with select options.

During a correction run, findings can be fixed via automation, or the fixing of findings can be simulated. A correction run may be performed on the workload that is filtered by a correction variant. The cleanup tool 112 should correct the findings for fixing or simulating the fixing. The correction can be run in simulation mode to simulate the fixing. Further, the correction may be automated or may run in the background.

Access Analyzer

The cleanup tool 112 may include an Access Analyzer that enables an investigation into access and protection mechanisms on transactions. The Access Analyzer determines whether data in a business application (e.g. ERP system) is accessed through transactions and reports. This access analysis can detect security gaps automatically. The Access Analyzer is a tool that analyzes code statically for accesses (e.g. database access). This can provide automatic design recommendations for customers. The Access Analyzer is configured to dynamically analyze accesses.

Specifically, the Access Analyzer may be a tool or feature of the cleanup tool 112 that provides insights on custom code and transactions for roles for authorizations for access control within an ERP, such as SAP®. The Access Analyzer can not only provide a static analysis of custom code, but can also dynamically analyze custom code and accesses. The analysis may be based on analysis cases, which are part of the Access Analyzer, and allow investigation of specific access or protection on objects (e.g. Database Create Access, Database Read Access, Authority Object in a Transaction, CALL TRANSACTION in code and others).

The Access Analyzer can provide insight on how software objects are accessed beginning from defined starting points and also on how software object's access are protected. The Access Analyzer may provide insight on what CRUD (Create/Read/Update/Delete) operations are performed on certain database tables and which database content is touched. The Access Analyzer can assist in role generation, segregation of duties, and identification of missing authorization checks. The Access Analyzer may collect data on accesses and authorizations in given software objects that include CRUD-Operations, AUTHORIZATIONs, CALL TRANSACTIONs, and Function Module Calls.

Figure 2:
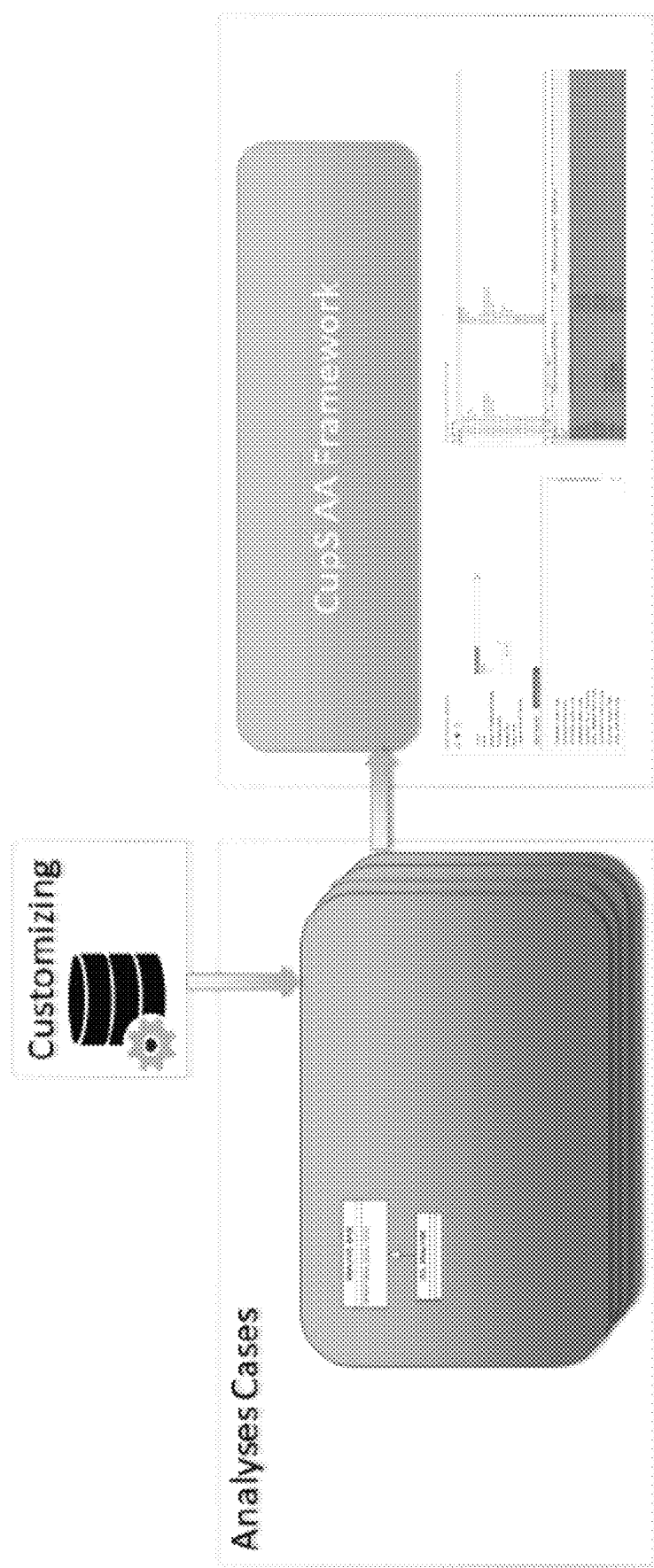
FIG. 2 is a system diagram of an Access Analyzer.

FIG. 2 is a system diagram of an Access Analyzer. FIG. 2 illustrates a custom application on the level of the source code, along the complete call stack. The analyses cases are checks within the sources for coding practices, relevant e.g. for design of Roles for Authorizations. The Analyses Cases can be customized through a customizing process for use in the CUPS (i.e. the Cleanup Tool) AA Framework. Exemplary analyses cases include Database Create Access; Database Read Access; Database Update Access; Database Delete Access; Authority Object in Transaction; CALL TRANSACTION in Code; AUTHORITY-CHECK in Code; Authority Group in Table; and/or CALL FUNCTION in Code. The framework of the Access Analyzer is open, which allows new Analysis Cases by customers. This can be performed through the Customizing.

For the Access Analyzer, a user can start by selecting the objects to be analyzed, and the Analysis Cases to be used in the analysis. The Access Analyzer includes a Viewer transaction that allows a user to view past analyses. The Access Analyzer can be customized by defining of analysis cases to be added to the framework. Further customization includes defining of authority objects for analysis cases, such as excluding an authority object from the analysis view or instructing the Access Analyzer to mark it with a color when there is an occurrence in the analysis result. Another customization is defining namespace/package for analysis cases and may exclude complete namespaces from an analysis run.

Figure 3:
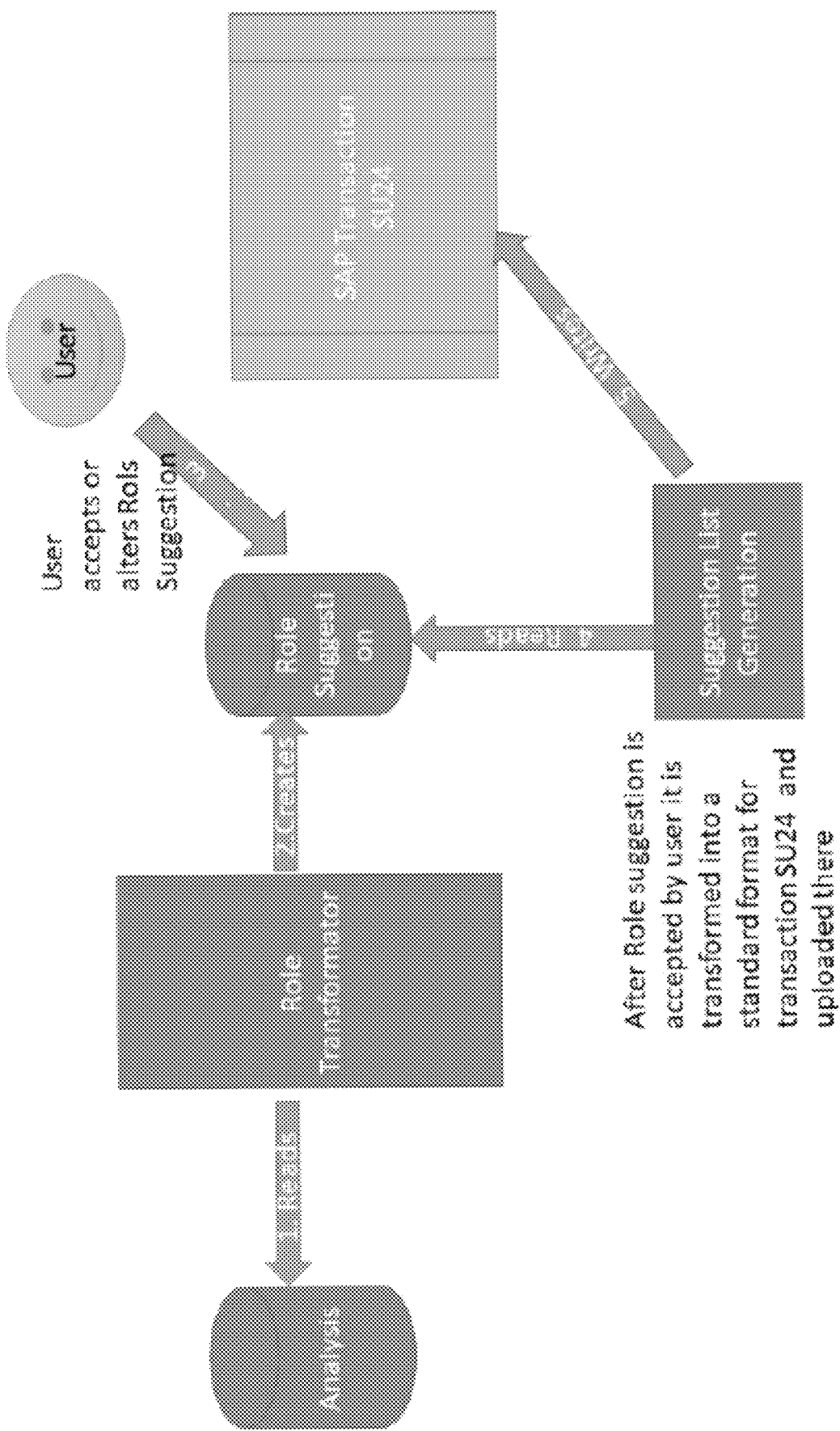
FIG. 3 is a diagram showing automatic role generation.

FIG. 3 is a diagram showing automatic role generation. First, an existing analysis is read. The role transformator creates a role for the role suggestion. In particular, based on the stored analysis information, an extract of Authorization Objects and Field Values for the Objects is created. The role suggestion is an output created by the application. The extract is displayed for the user, who can then review, accept, or alter the role suggestion. Once the role suggestion is accepted or finalized by the user, it can be transformed into a standard format for a particular business application. For example, upon confirmation a standardized list is generated and imported into a business application, such as an ERP system (e.g. SAP® standard transaction SU24). The role generation is written and triggered in the appropriate transaction system. The results of an analysis can make suggestions on how a suited role has to look and the result will be transferred to the SAP Standard Transaction SU24, which by default knows suggestion values for SAP Standard Transactions.

Figure 4:
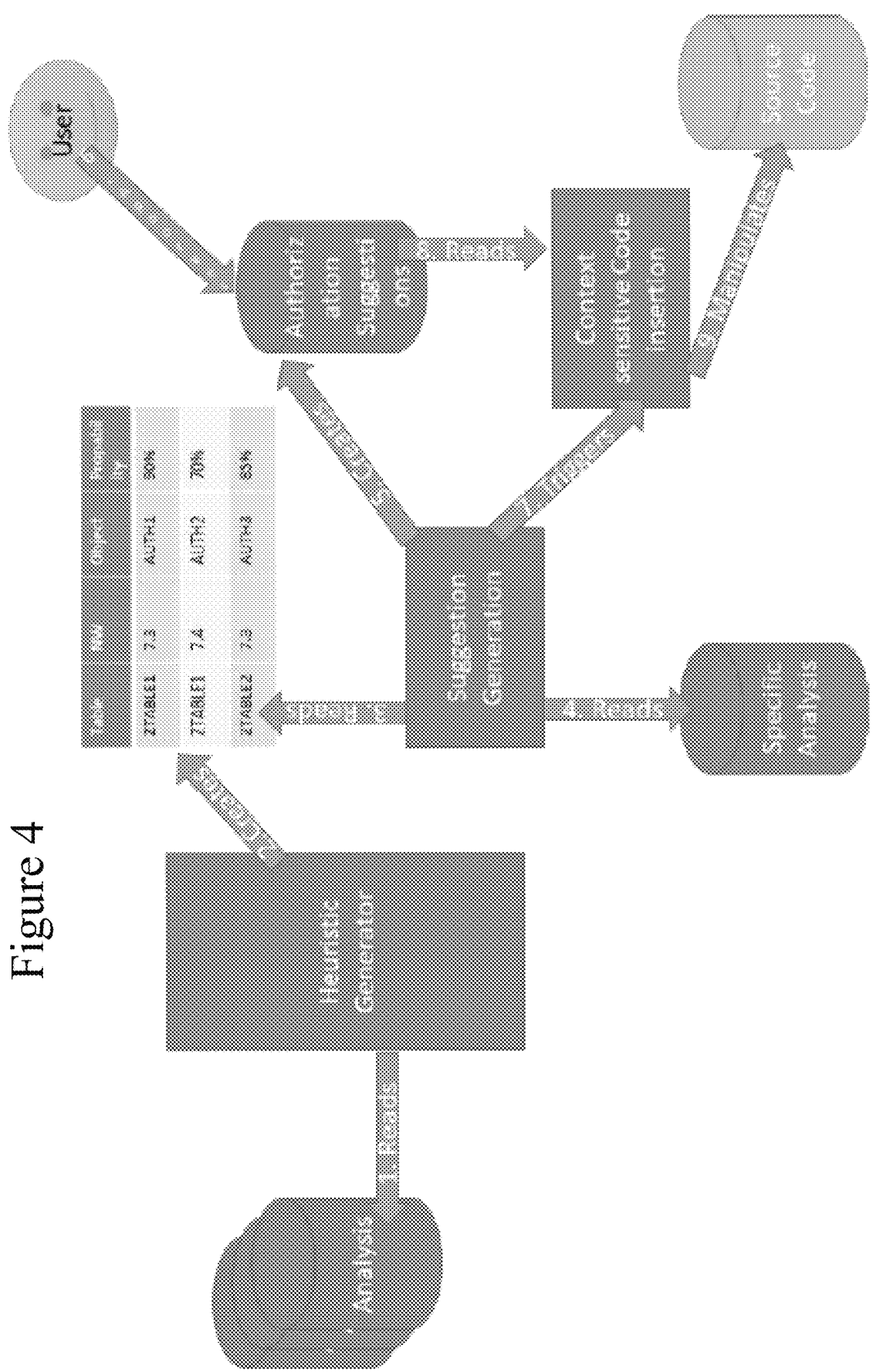
FIG. 4 is a diagram showing automatic authorization implementation.

FIG. 4 is a diagram showing automatic authorization implementation. The automatic authorization implementation may utilize a heuristic, which can give some kind of probability which authorization can be inserted when one is missing in the customer code. When there is a large amount of analysis, information can be derived of what authorization is commonly used near any given objects (e.g. tables or BaDIs).

First, an existing analysis is read by a heuristic generator. The heuristic generator creates heuristic probability analysis of objects that is read by a suggestion generation. The suggestion generation can also read specific analysis, which may be similar to or different from the existing analysis that is initially read. The suggestion generation creates authorization suggestions for the user. The authorization suggestions can be approved by the user. The authorization suggestion can be read by context sensitive code insertion that can manipulate the original source code.

The authorization check can be automated. The existing standard code is analyzed for authorization checks being used near a software object. Based on this, there is a build list of probabilities which Authorization Objects belongs to which Software Objects. This list can make recommendations to the user which authorization checks should be used in the code. The list may look like the following table:

TABLE 1

Authorization List Table

| AUTHORIZATION | Object | Object Name | Probability |
|---|---|---|---|
| S_AUTH1 | Table | Table1 | 96% |
| S_AUTH2 | Function Module | FM_FUNC1 | 70% |
| S_AUTH3 | Table | Table2 | 80% |

The table shows there is a probability of 96% that the Authorization Object S_AUTH1 is used for Authorization Checks on Database Table Table1.

There may be scans on a SAP system to get an mapping of which Authorizations are used in combination with which software objects (e.g. Tables or BAdIs). Based on this a user can receive targeted suggestions on which Authorization is missing in any custom code.

A needed authorization list for a given set of transactions similar to the SU24 Suggestion List may be generated. This list can be compared with the roles of users to give user advice if the users are over- or underprivileged for given transactions.

ABAP development tools ("ADT") can be used for reading code for generating an archive of a central system to have a zero footprint. As ADT may be a web service, the Access Analyzer may be re-implemented outside of the ERP (e.g. SAP).

Machine Learning and the Access Analyzer

The building of an authorization list could be subject to machine learning. The human cost of building the authorization list (after scanning code and evaluating results, but before implementing the authorization and testing) is high. The machine learning can provide a fitting recommendation on Authorizations when knowing the code context based on known authorizations from the code context There are many scans of an ERP system with Access Analyzer to get a mapping of which Authorizations are used in combination with which software objects (e.g. Tables or BAdIs). Based on this the system can give a Customer/user suggestions about which Authorization is missing in the custom code. A recommendation engine can be established for machine learning the authorization list generation. Authorizations can be a source of risk that need addressed and which the machine learning by the Access Analyzer can increase efficiency.

Original System Changer

An Original System Changer may be an application or tool that is part of the Cleanup Tool. The Original System Changer may enable performance of bulk changes on the system. Specifically, it can help change a large amount of Original System objects in an automated fashion, in preparation for the Automated Correction Engine.

In some business applications (such as SAP®), each object may have what is referred to as an Original System where it is possible to develop on. On systems other than the Original System, development may either be denied or the changes may be treated as a repair/modification. Accordingly, it may sometimes be necessary to change the Original System of a software object. This operation may be complicated when involving many objects. The Original System Changer helps to change a large number of objects in the Original System in an automated fashion.

The Original System Changer may require inputs such as the Program ID, Object Type, Object Name, Package, etc. The user can select either to display the changes or update, which can update the objects with the changes. The results can be displayed as a list of objects that match the criteria inputs. The user can then correct the Original System.

The meaning of specific details should be construed as examples within the embodiments and are not exhaustive or limiting the invention to the precise forms disclosed within the examples. One skilled in the relevant art will recognize that the invention can also be practiced without one or more of the specific details or with other methods, implementations, modules, entities, datasets, etc. In other instances, well-known structures, computer-related functions or operations are not shown or described in detail, as they will be understood by those skilled in the art.

The discussion above is intended to provide a brief, general description of a suitable computing environment (which might be of different kind like a client-server architecture or an Internet/browser network) in which the invention may be implemented. The invention will be described in general context of computer-executable instructions, such as software modules, which might be executed in combination with hardware modules, being executed by different computers in the network environment. Generally, program modules or software modules include routines, programs, objects, classes, instances, components, data structures, etc., that perform particular tasks or implement particular abstract data types. Computer-executable instructions, associated data structures and program modules represent examples of the program code means for executing steps of the method described herein. The particular sequence of such executable instructions, method steps or associated data structures only represent examples of corresponding activities for implementing the functions described therein. It is also possible to execute the method iteratively.

Those skilled in the art will appreciate that the invention may be practiced in a network computing environment with many types of computer system configurations, including personal computers (PC), hand-held devices (for example, smartphones), multi-processor systems, microprocessor-based programmable consumer electronics, network PCs, minicomputers, mainframe computers, laptops and the like. Further, the invention may be practiced in distributed computing environments where computer-related tasks are performed by local or remote processing devices that are linked (either by hardwired links, wireless links or by a combination of hardwired or wireless links) through a communications network. In a distributed computing environment, program modules may be located in local or remote devices, memory systems, retrievals or data storages.

Generally, the method according to the invention may be executed on one single computer or on several computers that are linked over a network. The computers may be general purpose computing devices in the form a conventional computer, including a processing unit, a system memory, and a system bus that couples various system components including system memory to the processing unit. The system bus may be any one of several types of bus structures including a memory bus or a memory controller, a peripheral bus and a local bus using any of a variety of bus architectures, possibly such which will be used in clinical/medical system environments. The system memory includes read-only memory (ROM) and random access memories (RAM). A basic input/output system (BIOS), containing the basic routines that have the functionality to transfer information between elements within the computer, such as during start-up, may be stored in one memory. Additionally, the computer may also include hard disc drives and other interfaces for user interaction. The drives and their associated computer-readable media provide non-volatile or volatile storage of computer executable instructions, data structures, program modules and related data items. A user interface may be a keyboard, a pointing device or other input devices (not shown in the figures), such as a microphone, a joystick, a mouse. Additionally, interfaces to other systems might be used. These and other input devices are often connected to the processing unit through a serial port interface coupled to system bus. Other interfaces include a universal serial bus (USB). Moreover, a monitor or another display device is also connected to the computers of the system via an interface, such as video adapter. In addition to the monitor, the computers typically include other peripheral output or input devices (not shown), such as speakers and printers or interfaces for data exchange. Local and remote computer are coupled to each other by logical and physical connections, which may include a server, a router, a network interface, a peer device or other common network nodes. The connections might be local area network connections (LAN) and wide area network connections (WAN) which could be used within intranet or internet. Additionally, a networking environment typically includes a modem, a wireless link or any other means for establishing communications over the network. Moreover, the network typically comprises means for data retrieval, particularly for accessing data storage means like repositories, etc. Network data exchange may be coupled by means of the use of proxies and other servers.

The example embodiments are to be considered in all respects only as illustrative and not restrictive. The scope of the invention is, therefore, indicated by the appended claims rather than by this description. All changes which come within the meaning and range of equivalency of the claims are to be embraced within their scope.

The invention claimed is:

1. In a business application, a computer system for correcting custom code, comprising:
   a system that includes custom code, wherein the custom code comprises custom changes that are external the system;
   a cleanup tool that automates corrections to the custom code with a hardware processor, wherein the cleanup tool further comprises:
      an access analyzer that dynamically analyzes access for the system including access or protection on software objects of the custom code and outputs an analysis of access change, wherein the analyzer utilizes analyses cases that are customized for providing a role suggestion that comprises one or more authorization from a user and wherein an authorization list for a set of transactions is generated and compared with roles of users to provide user advice regarding whether the users are overprivileged or underprivileged for the transactions; and
      an automated correction engine that provides details on the corrections to the software objects of the custom code based on the access or protection analyzed by the access analyzer.

2. The computer system of claim 1, wherein the cleanup tool further comprises:
   a monitor that monitors changes to code of the system.

3. The computer system of claim 2, wherein the custom code comprises code that is changed as identified from the monitor.

4. The computer system of claim 1, wherein the role suggestion further comprises suggestions on how a suited role appears and how results of the authorizations that will be transferred.

5. The computer system of claim 1, wherein the access analyzer further comprises a machine learning build that provides recommendations for the authorization list.

6. The computer system of claim 1, wherein the business application comprises a software application.

7. The computer system of claim 6, wherein the software application comprises at least one of Customer Relationship Management (CRM), Supplier Relationship Management (SRM), Supply Chain Management (SCM), Product Lifecycle Management (PLM), Human Capital Management (HCM), Integration Platforms, Business Warehouse (BW), Business Intelligence (BI), or enterprise resource planning (ERP).

8. In a business application, a computer system for correcting custom code, comprising:
   a system that includes custom code;
   a cleanup tool that automates corrections to the custom code with a hardware processor, wherein the cleanup tool comprises:
      an access analyzer with machine learning that provides an authorization list recommendation based on dynamic analysis of access for the system, wherein the authorization list is for a set of transactions and compared with roles of users to provide user advice regarding whether the users are overprivileged or underprivileged for the transactions; and
      an automated correction engine that provides details on the corrections to the custom code based on the authorization list and the user advice from the access analyzer.

9. The computer system of claim 8, wherein the business application comprises at least one of Customer Relationship Management (CRM), Supplier Relationship Management (SRM), Supply Chain Management (SCM), Product Lifecycle Management (PLM), Human Capital Management (HCM), Integration Platforms, Business Warehouse (BW), Business Intelligence (BI), or enterprise resource planning (ERP).

10. The computer system of claim 8, wherein the authorization list is for role suggestion for the user.

11. The computer system of claim 10, wherein the role suggestion comprises suggestions on how a suited role appears and how results of authorizations from the authorization list will be transferred.

* * * * *